United States Patent [19]

Driggers et al.

[11] Patent Number: 4,795,885
[45] Date of Patent: Jan. 3, 1989

[54] FLEXIBLE RADIANT TUBE HEATER

[75] Inventors: John M. Driggers, Pittsburgh; Thomas J. Saska, Lower Burrell; Bruce W. Bevilacqua, Penn Township, Westmoreland County, all of Pa.

[73] Assignee: Westinghouse Electric Corp., Pittsburgh, Pa.

[21] Appl. No.: 171,198

[22] Filed: Mar. 21, 1988

Related U.S. Application Data

[63] Continuation of Ser. No. 864,619, May 16, 1986, abandoned.

[51] Int. Cl.$^4$ .............................................. H05B 3/40
[52] U.S. Cl. ..................................... 219/534; 219/535; 338/214
[58] Field of Search ...................... 219/523, 534–535, 219/315, 316; 338/214

[56] References Cited

U.S. PATENT DOCUMENTS

| | | |
|---|---|---|
| 2,946,837 | 5/1958 | Beamish . |
| 3,125,655 | 3/1964 | McBrien et al. . |
| 3,275,803 | 2/1964 | True . |
| 3,551,115 | 12/1970 | Jamieson et al. . |
| 3,622,731 | 11/1971 | Ando . |
| 3,764,724 | 10/1973 | Mulvany . |
| 3,898,431 | 8/1975 | House et al. . |
| 4,072,847 | 2/1978 | Craven . |
| 4,150,281 | 4/1979 | Hinz . |
| 4,319,070 | 3/1982 | Imai et al. . |
| 4,464,565 | 8/1984 | Spangler . |
| 4,479,029 | 10/1984 | Banov et al. . |
| 4,523,177 | 6/1985 | Driggers et al. . |
| 4,532,396 | 6/1985 | Burack et al. . |
| 4,572,938 | 2/1986 | Driggers et al. . |
| 4,574,171 | 3/1986 | Burack et al. ................ 219/10.49 R |
| 4,574,172 | 3/1986 | Burack et al. . |
| 4,631,392 | 12/1986 | O'Brien . |

FOREIGN PATENT DOCUMENTS 834879 3/1952 Fed. Rep. of Germany .
1018707 2/1966 United Kingdom .

OTHER PUBLICATIONS

EPRI Document No. NP-3056 entitled "In Situ Heat Treatment and Polythionic Acid Testing of Inconel 600 Row 1 Steam Generator U-Bends", pp. 5-1-5-2, 1-1-1-4 and 2-1, dated Apr., 1983.
Publication, "Everything You Ever Wanted to Know About Electric Heaters and Control Systems", by Watlow, Inc.

Primary Examiner—E. A. Goldberg
Assistant Examiner—Lincoln Donovan

[57] ABSTRACT

A flexible radiant tube heater is disclosed herein which is particularly useful in thermally stress-relieving the U-bend sections of the heat exchange tubes within nuclear steam generators. The apparatus generally comprises an elongated, flexible mandrel formed from a spring composed of a heat-resistant alloy, a flexible electrical resistance heating element wound around the mandrel spring, and a flexible insulating sleeve formed from braided alumina fibers disposed around the heating element for electrically insulating the heating element from both the metallic spring and the inner walls of the tube. A nosepiece assembly and an endpiece are disposed on the front and back ends of the spring, respectively. A flexible reinforcing member which may be a thin rod of Inconel TM is mounted to both the nosepiece assembly and the endpiece and disposed through the windings of the mandrel coil in order to lend more tensile and compressive strength to the mandrel coil. A push rod formed from a stainless steel cable is connected to the endpiece for sliding the heater to a desired location in a tube.

21 Claims, 9 Drawing Sheets

FLEXIBLE RADIANT TUBE HEATER

This application is a continuation of application Ser. No. 864,619, filed May 16, 1986, now abandoned.

BACKGROUND OF THE INVENTION

1. Field of the Invention

This invention relates to an apparatus for remotely applying radiant heat across a curved section of a metallic tube from the interior of the tube. It is particularly useful in heat treating the U-bend sections of heat exchange tubes in order to stress-relieve them.

2. Description of the Prior Art

Devices and processes for applying heat to the inside surfaces of tubes are known in the prior art. Such devices are frequently used to braze reinforcing sleeves within the U-shaped heat exchange tubes of nuclear steam generators. One such device generally comprises a mandrel integrally formed from a rigid, heat-resistant ceramic material, such as boron nitride. The central portion of the mandrel includes a set of spiral grooves for receiving and spacing apart an electrical resistance heating element, which may be a platinum-rhodium wire. The ends of such mandrels each include enlarged shoulders for concentrically spacing the coiled heating element from the inner walls of the tube. An example of such a radiant heater is described and claimed in U.S. patent application Ser. No. 634,336, filed July 13, 1984 by John M. Driggers and assigned to the Westinghouse Electric Corporation, the entire specification of which is hereby expressly incorporated herein.

In operation, the elongated cylindrical body of the heater is inserted into the open end of a tube, and slidably positioned adjacent to a region of the tube where a brazing heat needs to be applied. Typically, such heaters are used to braze in place a cylindrical reinforcing sleeve which has been inserted into a heat exchange tube across a section of the tube where the outer walls have been attacked by corrosion. When the proximal and distal ends of such sleeves are brazed to the inner walls of the tube, a fluid bridge is formed across the corroded section of the tube. In order to position the heater to a desired location within the tube or sleeve, a nylon push rod attached to the proximal end of the mandrel is used. A specific process for positioning such a heater to effect such braze joints is described and claimed in the aforementioned patent application Ser. No. 634,336.

Unfortunately, such prior art tube heaters are not well adapted for use along the more tightly curved U-bend sections of the heat exchange tubes in nuclear steam generators. While it may be possible to slidably position such heaters along the U-bend sections of such tubes having a large radius of curvature, the rigid, elongated mandrel simply cannot negotiate tubes having small-radiused U-bend sections. Such small-radiused U-bend sections are present in the central portion of the tube plate of nuclear steam generators. Here, the U-bend radii may be as short as two inches. The inability to negotiate such U-bends is a significant limitation, since it has been recently discovered that such small-radiused U-bend sections frequently contain a sustantial amount of residual tensile stress which can cause these sections of the tubes to degrade and crack as a result of the well-known phenomenon of stress-corrosion cracking. Such cracking can, of course, cause the nonradioactive water in the secondary system of the steam generator to become radioactively contaminated by the hot, radioactive water which flows through the primary system of the steam generator. This, in turn, will cause the steam which drives the electric turbines to become radioactively contaminated. While such residual tensile stresses may be relieved by annealing these tightly curved sections of the centrally disposed heat exchange tubes, prior art tube heaters having rigid mandrel structures offer no convenient and practical way to apply annealing heats to these sections.

Tube heaters having some degree of flexibility are also known in the prior art. However, these heaters are likewise ill-adapted to heat treat such U-bends. Such a tube heater is exemplified by U.S. Pat. No. 4,532,396 by Robert D. Burack et al. and assigned to the Westinghouse Electric Corporation. While this particular tube heater is capable of producing high quality braze joints in the sections of the heat exchange tubes close to the tubehseet, power transmission problems would arise if one attempted to use this induction-type heater twenty to thirty feet above the tubesheet where the U-bend sections of the tubes are located. Specifically, because only about one-twentieth of the power applied to such a heating coil would ultimately be transferred to the U-bends, a very large and expensive power source would be necessary for such a heater to heat treat the U-bend of a tube in a short time. Since generator downtime is very expensive, any annealing device which cannot heat treat these U-bends within a few minutes time would simply be impractical. Finally, such tube heaters are simply not sufficiently flexible for use within the smaller U-bend radii.

Clearly, there is a need for a tube heater capable of quickly, conveniently and inexpensively applying heat across the U-bend sections of the heat exchange tubes of nuclear steam generators in order to relieve the residual stresses therein. Ideally, such a heater should be quickly and easily slidable up the straight leg portion of the tubes (which may be 30 feet long) and into the U-bend portion thereof and should be operable through a small and inexpensive power source. Such a heater should also have the ability to quickly expose a large portion of a small-radiused U-bend section to an annealing heat in order to minimize the time necessary to complete the annealing operation. Finally, such a tube heater should be extremely reliable in operation and durable in construction so that it can quickly anneal a large number of small-radiused U-bend sections before it needs to be replaced.

SUMMARY OF THE INVENTION

In its broadest sense, the invention is a heating apparatus for applying heat across a selected section of a conduit, such as a metallic tube, which has at least one nonlinear longitudinal section. The apparatus generally comprises an elongated flexible mandrel having a flexible electrical resistance heating element coiled thereabout which is insertable within and positionable along nonlinear portions of the tube. The mandrel is preferably formed from a spring of a heat resistant metal, such as Inconel TM 600. The individual coils of the metal spring may be slightly spaced apart in order to eliminate any possibility of sintering from occurring between adjacent coils when the electrical resistance element is actuated.

The heating apparatus may further include a means for electrically insulating the coils of the heating element from the metallic spring forming the mandrel, as well as the inner walls of the metallic tube which it heats. In the preferred embodiment, this insulating means is a sleeve of braided, flexible and heat-resistant fibers formed from a refractory material such as alumina. This sleeve envelops the heating element, which in turn may be formed from a pair of braided platinum-rhodium wires coiled about the metal spring of the mandrel. In addition to electrically insulating the heating element from the mandrel spring and the metallic inner walls of the tubing, this sleeve also prevents short circuiting from occurring between adjacent windings of the heating element coil, and provides spacing between the individual coil windings in order to prevent "hot spots" from occurring in the heating element coil.

A nosepiece assembly having a bullet-shaped nosepiece may be mounted in front of the mandrel spring in order to allow the heating apparatus to be smoothly inserted through a U-bend section of a tube without scratching, scouring or straining the inner walls of the U-bend section. An endpiece may be mounted in back of the mandrel spring in order to hold an electrical connector assembly which connects the heating element to a power source. A flexible reinforcing member, such as a thin rod of Inconel TM, may be mounted between the nosepiece assembly and the endpiece in order to lend a greater amount of tensile and compressive strength to the spring forming the heater mandrel. The provision of such a reinforcing member in the mandrel is important, since the mandrel spring can be subjected to a significant amount of compressive and tensile force when it is being pushed and pulled into and out of the U-bend section of a heat exchange tube. Additionally, the flexible reinforcing member may be surrounded by a plurality of inter-nesting ceramic beads to increase the shear strength of the heater mandrel. Finally, the apparatus may include a flexible cable means for slidably positioning the flexible mandrel and the heating element coiled therearound in the vicinity of the U-bend of a tube.

The invention also encompasses a process wherein a heating apparatus as heretofore described is inserted along the longitudinal axis of a tube until it is positioned alongside a curved section thereof. The electrical heating element is then actuated until the tube is stress relieved, whereupon the heating apparatus is removed by manually withdrawing the metallic cable connected thereto.

This invention is particularly useful in applying heat across the U-bend sections of centrally disposed heat exchange tubes in nuclear steam generators in order to relieve any tensile stresses which may be present in them. The resulting mandrel is flexible enough to be easily inserted into the smallest radiused U-bends. The use of an electrical resistance element, instead of an induction heating mechanism, allows the device to be operated by means of a relatively small and inexpensive power source.

DESCRIPTION OF THE SEVERAL FIGURES

Figure 2A:
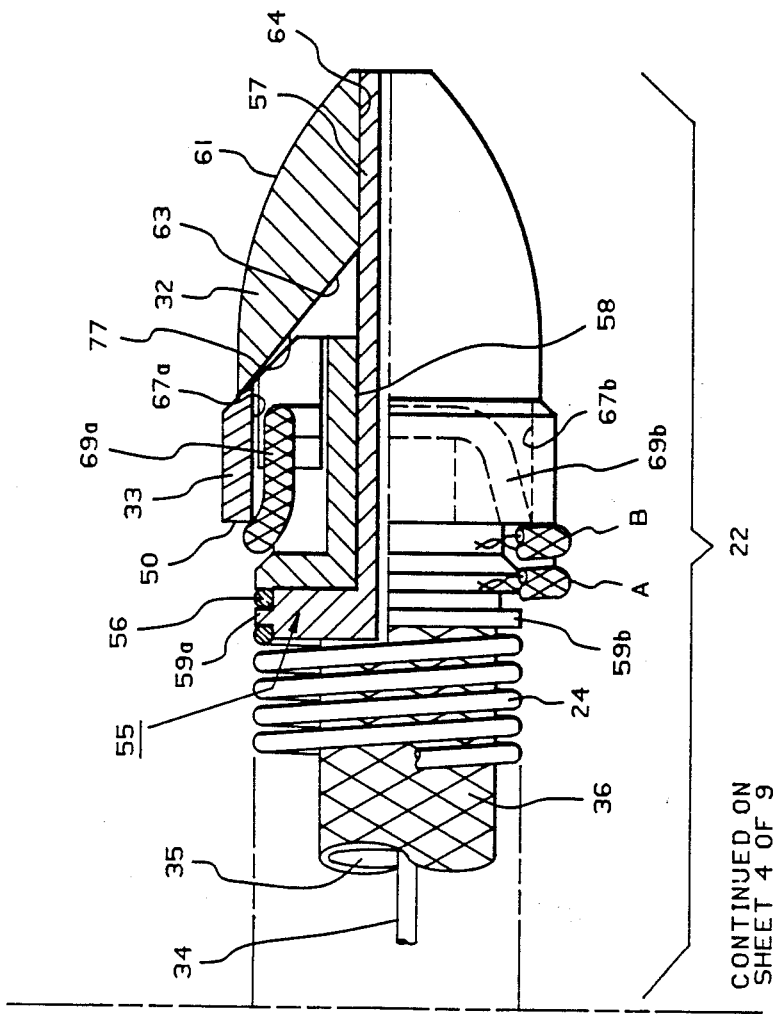
Figure 2B:
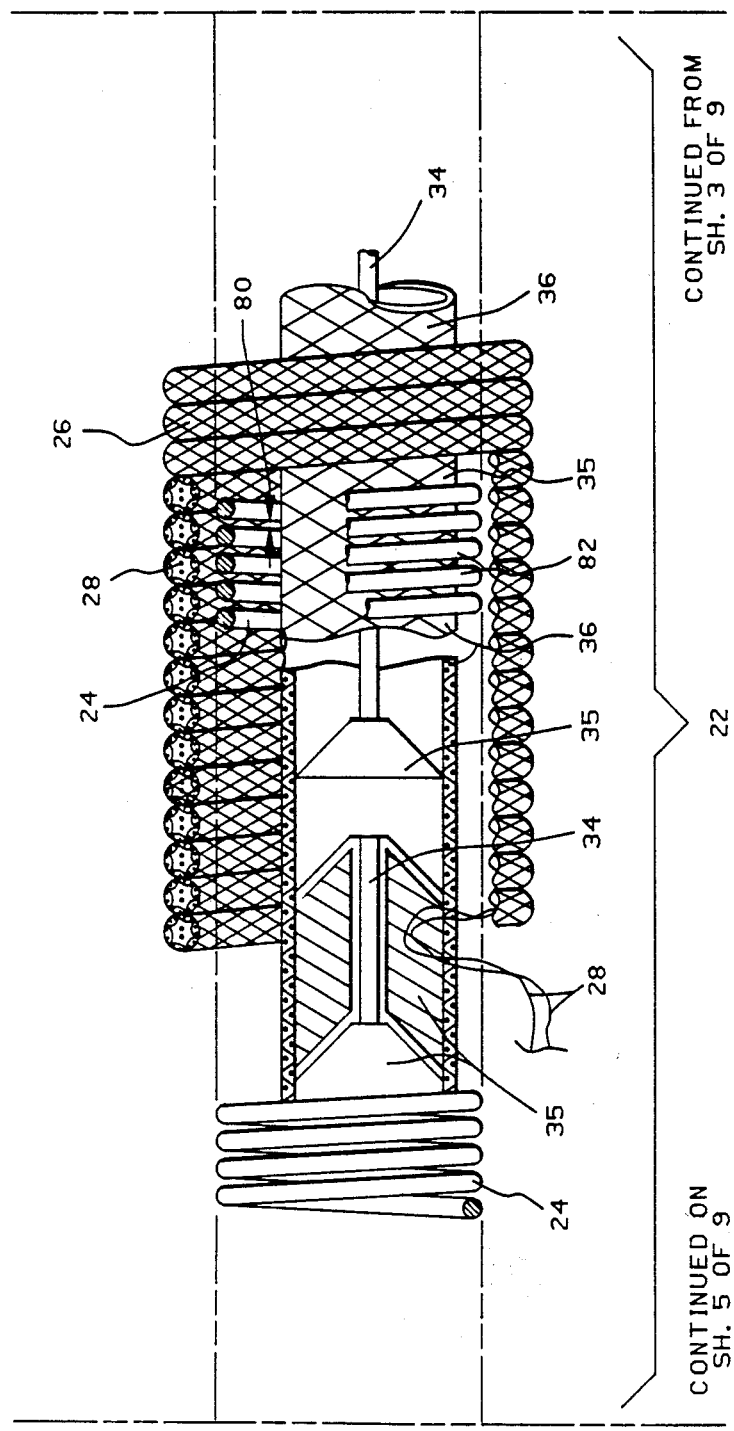
Figure 2C:
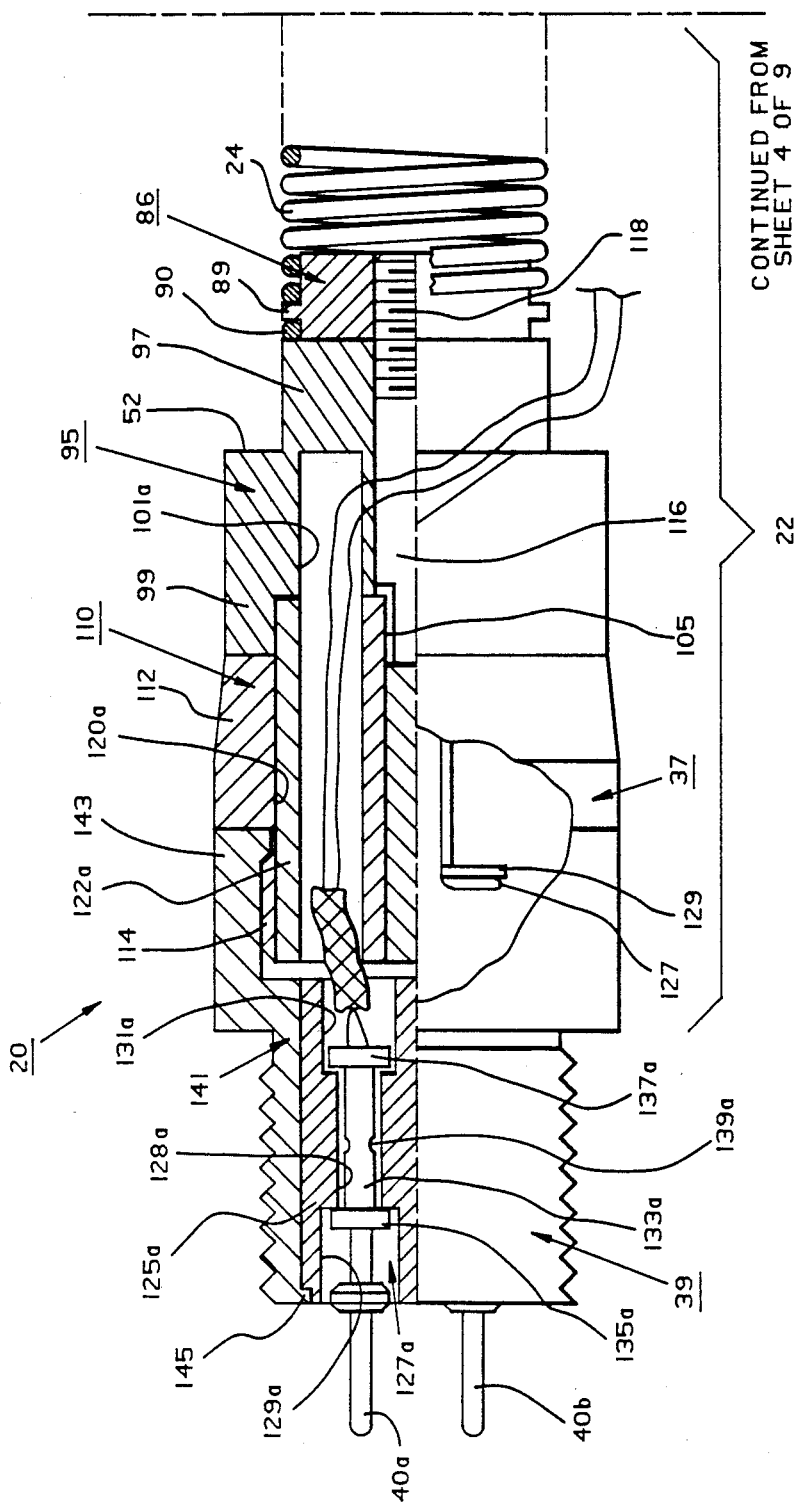
Figure 3B:
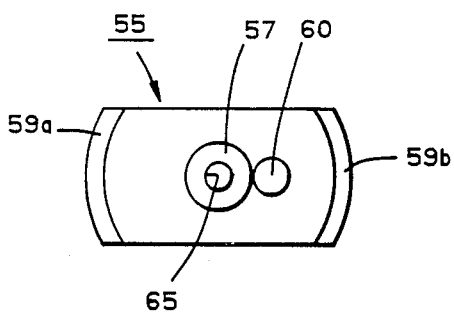
Figure 3D:
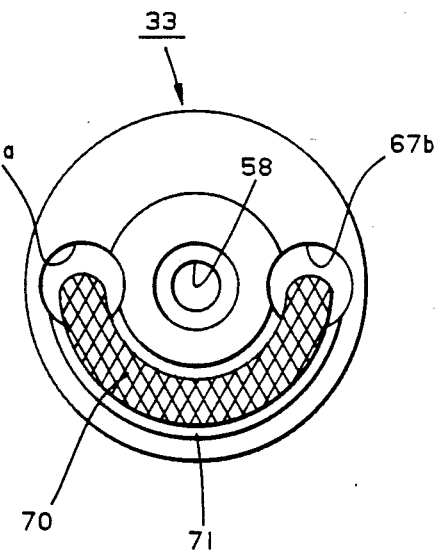
Figure 3A:
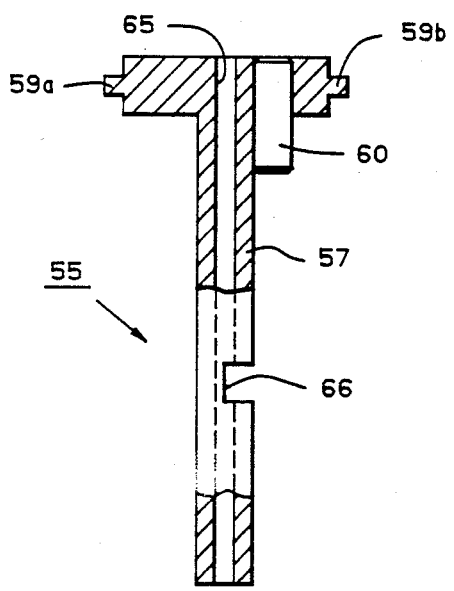
Figure 3C:
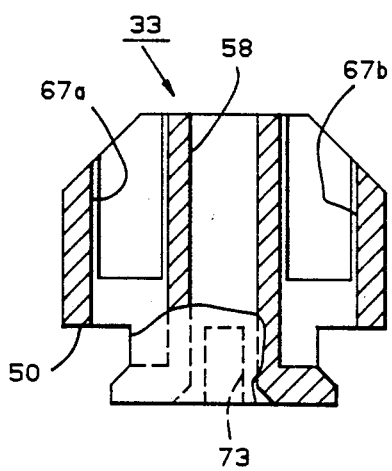
Figure 4B:
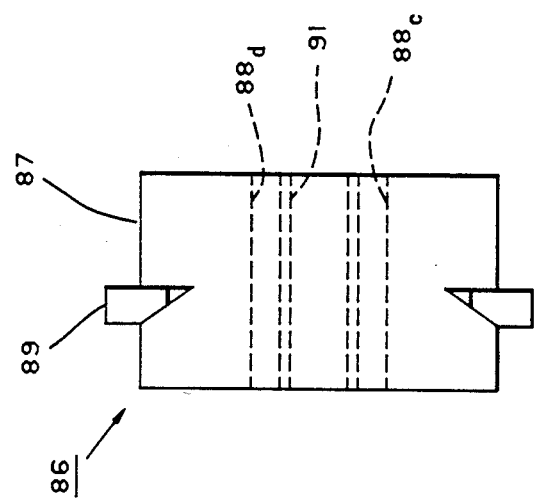
Figure 4A:
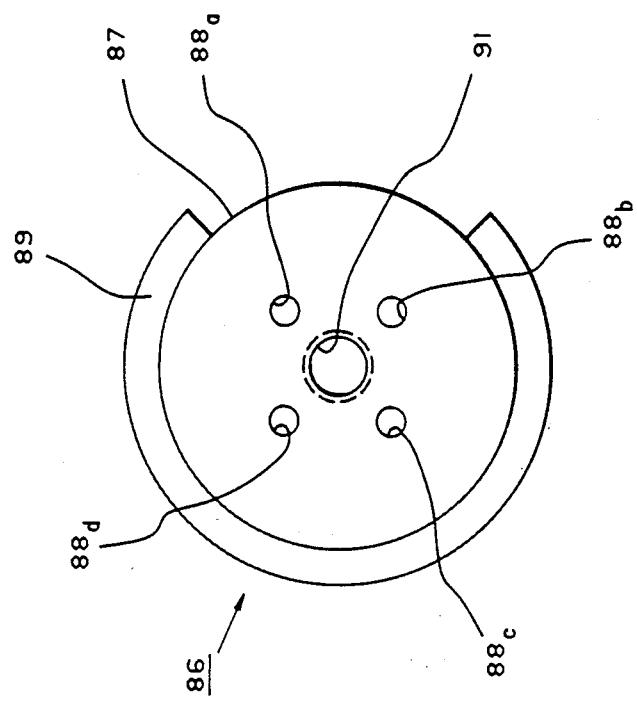
Figure 5B:
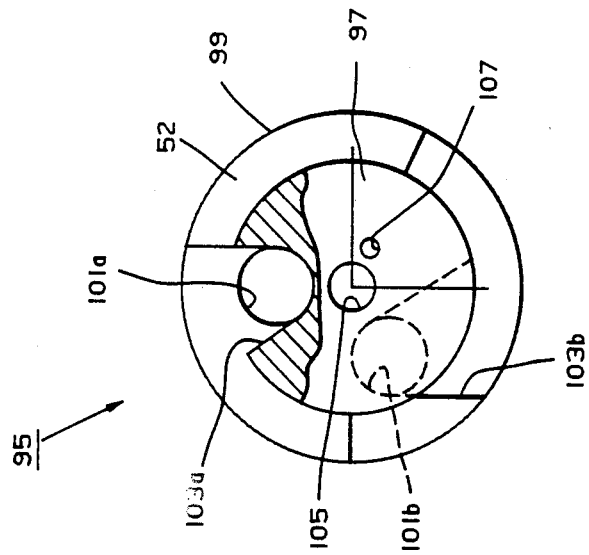
Figure 5A:
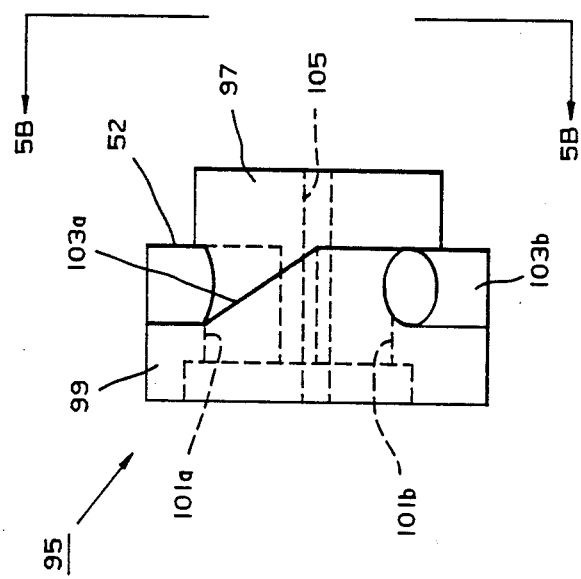
Figure 6A:
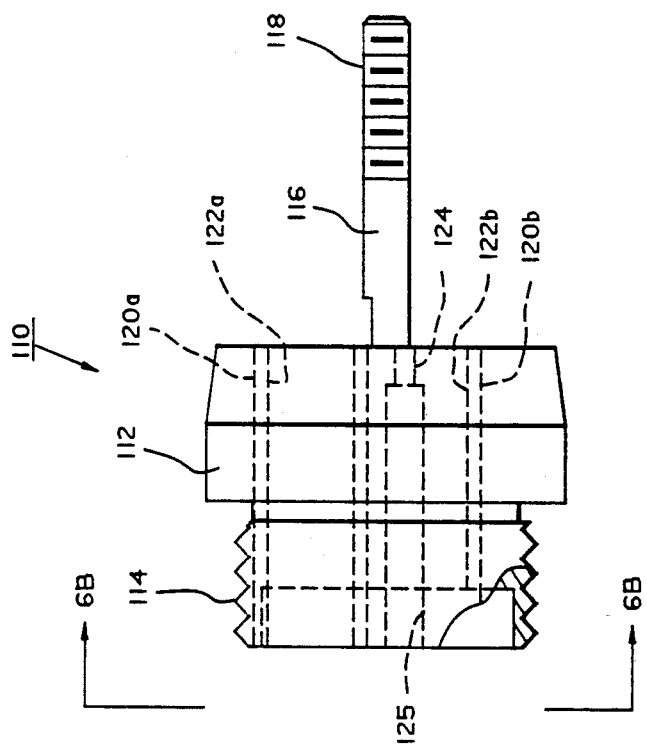
Figure 6B:
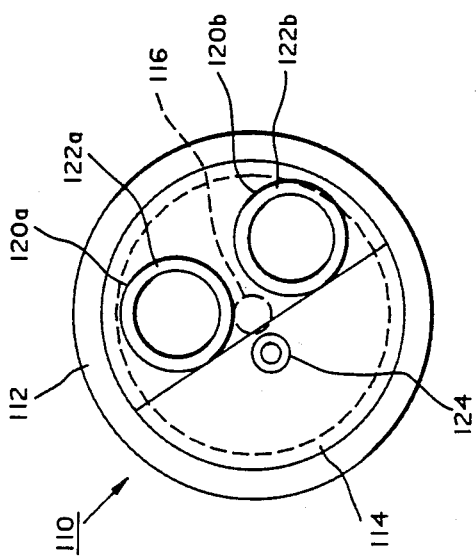

FIGS. 2A, 2B and 2C form a partial, cross-sectional sectional side view of the flexible radiant tube heater of the invention;

FIGS. 3A and 3B are a side cross-sectional view and a top view, respectively, of the distal spring retainer of the radiant tube heater;

FIGS. 3C and 3D are a side cross-sectional view and a top view, respectively, of the rear nosepiece of the radiant tube heater;

FIGS. 4A and 4B are a rear view and a side view, respectively, of the proximal spring retainer of the heater mandrel;

FIGS. 5A and 5B are a side view and a front view of the coil guide of the heater mandrel; and FIGS. 6A and 6B are a side view and rear view of the body nut adjacent to the endpiece of the heater mandrel.

DETAILED DESCRIPTION OF THE PREFERRED EMBODIMENT

General Description of the Structure and Operation of the Invention

Figure 1A:
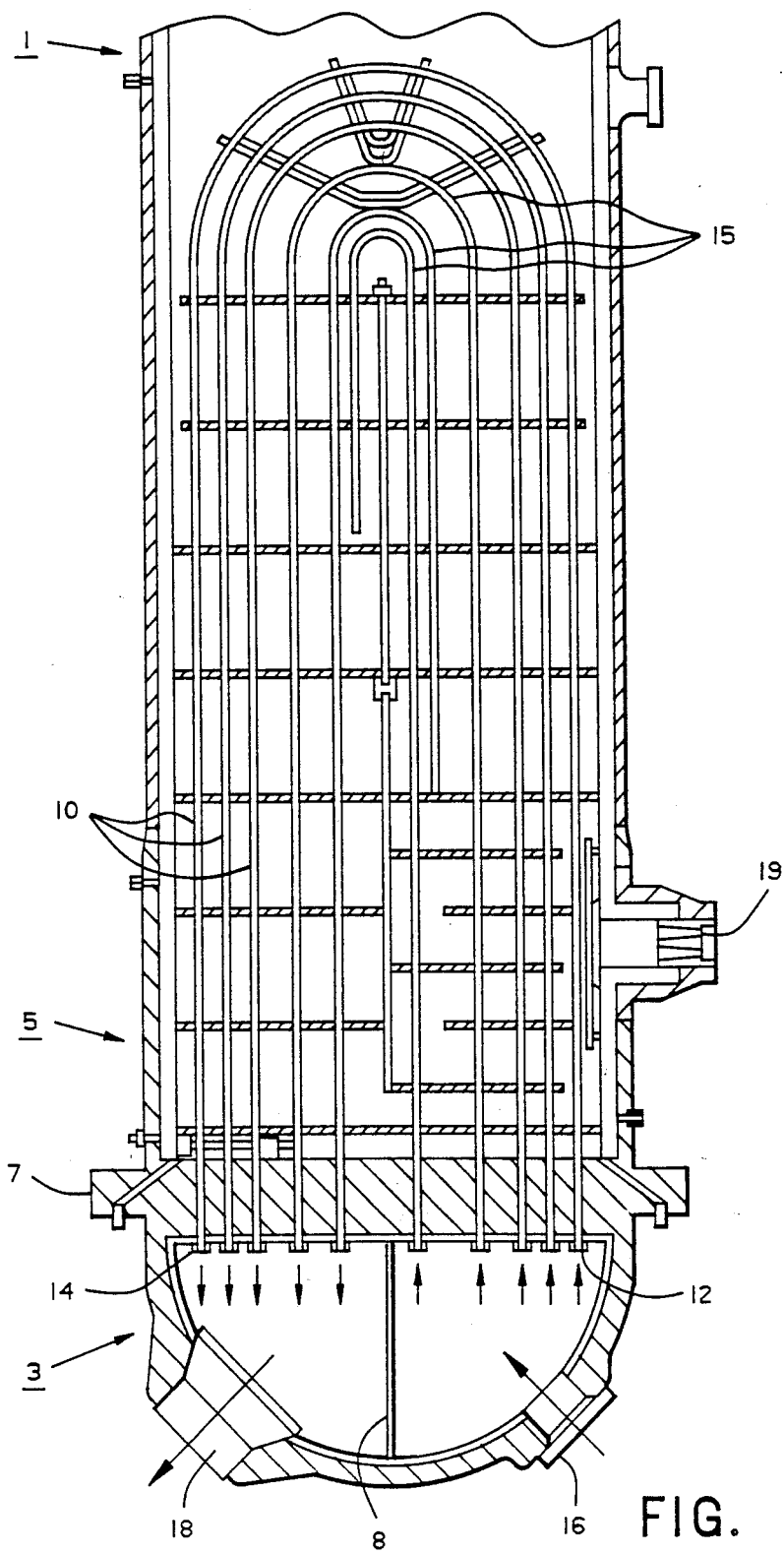
FIG. 1A is a cross-sectional view of a nuclear steam generator, illustrating the U-bend sections of the heat exchange tubes disposed therein.

With reference now to FIG. 1A wherein like reference numerals designate like components throughout all of the several figures, the invention is particularly adapted for annealing the U-shaped heat exchange tubes within a nuclear steam generator 1. Such generators generally include a bowl-shaped primary side 3 which underlies a cylindrically shaped secondary side 5. A tubesheet 7 hydraulically isolates the primary side 3 from the secondary side 5. A divider sheet 8 further hydraulically divides the bowl-shaped primary side 3 into an inlet side and an outlet side.

A plurality of U-shaped heat exchange tubes 10 extend up in the secondary side 5 of the generator 1. Each of the U-shaped tubes includes an inlet end 12 which communicates with the inlet side of the primary side 3, and an outlet end 14 which communicates with the outlet side of the primary side 3. Hot, radioactive water circulating through the nuclear reactor (not shown) enters into an inlet 16 in the inlet side of the primary side 3, where it in turn flows into the inlet ends 12 of the U-shaped heat exchange tubes 10. This hot, radioactive water circulates upwardly through the "hot legs" of the tubes 10, around the U-bend sections 15 thereof, and down toward the outlet side of the primary side 3 through the "cold legs" of these tubes (see flow arrows). This hot, radioactive water is discharged into the outlet side of the primary side 3, where it flows out of the primary outlet 18 and back into the nuclear reactor for re-heating.

While hot, radioactive circulates through the U-shaped heat exchange tubes 10 of the generator 1, non-radioactive water is admitted into the secondary side 5 of the generator 1 through the secondary water inlet 19. The heat transferred from the inner to the outer walls of the U-shaped heat exchange tubes 10 causes the water in the secondary side 5 of the steam generator 1 to boil, thereby creating nonradioactive steam which is ultimately used to power the generator turbines of an electrical power plant (not shown).

As is evident in FIG. 1A, the U-shaped heat exchange tubes 10 whose inlet ends 12 and outlet ends 14 are mounted closest to the divider sheet 8 have the smallest-radiused U-bend sections 15. The smallest of these radii may be as short as two inches. The applicants have found that the forming processes which impart such small-radiused U-bend sections 15 in such tubes 10 frequently also impart a substantial amount of residual tensile stresses in these sections 15. Applicants have also discovered that such substantial streses accelerate the extent to which these U-bend sections 15 may be attacked by corrosion within the secondary side 5 of the steam generator 1.

Figure 1B:
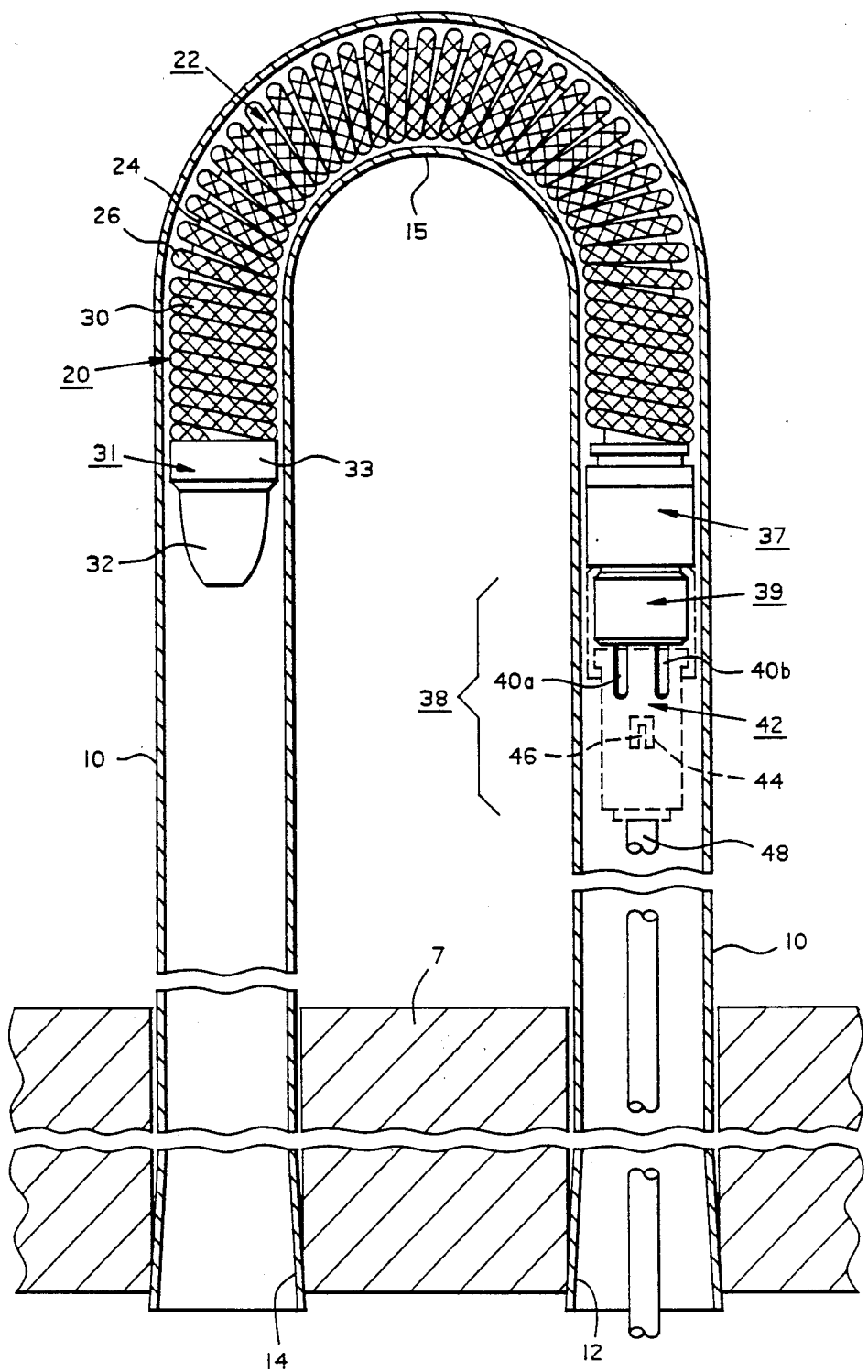
FIG. 1B illustrates the flexible radiant tube heater of the invention in an annealing position within one of the small-radiused U-bend sections of heat exchange tubing illustrated in FIG. 1A.

FIG. 1B discloses the heater assembly 20 of the invention which may be used to thermally relieve such corrosion-causing tensile stresses in the U-bend sections 15. Heater assembly 20 includes an elongated, flexible mandrel 22. In its middle portion, the mandrel 22 includes a coil spring 24 formed from a heat-resistant alloy, such as Inconel TM 600. Wound around the outside of the spring 24 is a heating coil 26. The interior of each of the windings of the heating coil 26 is formed from braided strands 28 of electrically resistive wire fabricated from a platinum-rhodium alloy (see FIG. 2B), while the exterior of each of these windings is formed from a braided sleeve 30 of heat resistant and electrically insulative fibers, such as alumina fibers. The insulating sleeve 30 prevents the windings of braided wire 28 from short circuiting through either the metallic coil spring 24, or the inner walls of the metallic tubes 10. In the preferred embodiment, the flexible insulating sleeve 30 is a sleeve approximately one-eighth of an inch in diameter formed from braided Nextel TM 440 fibers which are available from the Minnesota Manufacturing and Mining Company, located in St. Paul, Minn. In addition to the previously mentioned insulating functions, this sleeve 30 further prevents short circuiting from occurring between adjacent windings of the braided wire 28, and serves to uniformly space these adjacent windings apart so that the heat gradient generated by the heating coil 26 is free from thermal nonuniformities or hot spots. The specific structure of the interior of the middle portion of the mandrel 22 is discussed in more detail hereinafter.

Located in the interior of the mandrel 22 is a rod-like reinforcing member 34 which is preferably formed from Inconel TM (see FIG. 2B). As will be described in detail hereinafter, the reinforcing member 34 reinforces both the tensile and compressive strength of the spring 24. This rod-like reinforcing member 34 is surrounded by a plurality of ceramic beads 35 preferably formed from high-purity boron nitride. These beads include centrally disposed bores which allow them to be slidably threaded onto the rod-like member 34. Additionally, each of the beads 35 includes a frustro-conical projection at its front and a complementary frustro-conical recess in its rear so that some degree of nesting occurs between adjacent beads 35. These beads 35, and their mutual internesting, lend additional shear strength to the mandrel 22 as a whole. A tubular sleeve 36 of Nextel TM surrounds the in-tandem beads 35 in order to prevent any binding from occurring between the edges of the beads 35, and the coils of the spring 24 when the mandrel 22 is bent. This sleeve 36, in combination with the beads 35, also serves to insulate the rod-like reinforcing member 34 from the heat radiated from the heating coil 26.

At its distal or front portion, the mandrel 22 includes a nosepiece assembly 31 for facilitating the insertion of the mandrel 22 through the open end of a tube 10. This nosepiece assembly 31 includes a forward nosepiece 32 for protecting a coil connecting portion 70 (shown in FIG. 3D) of the heating coil 26, as well as a rear nosepiece 33 whose precise function will become evident presently. In the preferred embodiment, the forward nosepiece 32 is formed from No. 304 stainless steel, while the rear nosepiece 33 is formed from 99.9% pure boron nitride that is diffusion bonded. As is evident in FIG. 18, the forward nosepiece 32 has a bullet-shaped profile. This rounded profile allows the flexible mandrel 22 of the heater assembly 20 to be pushed through a small-radiused U-bend 15 with a minimum amount of stress on the heater assembly 20 and without scratching or scouring the interior surface of the U-bend 15. The nosepiece assembly 31 also provides a front anchor point for the rod-like reinforcing member 34 that extends throughout the center of the mandrel 22.

At its rear or proximal portion, the flexible mandrel 22 includes an endpiece 37 formed from No. 304 stainless steel. As will be discussed in more detail hereinafter, one of the principal purposes of the endpiece 37 is to provide a rear anchor point for the distal end of the rod-like reinforcing member 34. Endpiece 37 also serves to protect the rearmost windings of the heating coil 26 from mechanical shock.

Located directly behind the endpiece 37 is an electrical connector assembly 38, as is evident in FIG. 1B. The connector assembly 38 is generally formed from a male connector 39 which terminates in a pair of connector pins 40a, 40b, and a female receptacle 42 for receiving these pins. In the preferred embodiment, the female receptacle 42 includes a fiber-optic window 44 for allowing the infra-red radiation emanated by a recently treated tube 10 to strike an optical fiber 46 connected to a pyrometer (not shown). The exact structure of the fiber optic window 44 and optical fiber 46 of the female receptacle 42 is similar to the window and fiber disclosed in U.S. patent application Ser. No. 720,105 filed Apr. 4, 1985 by John M. Driggers et al. and assigned to the Westinghouse Electric Corporation (the entire specification of which is expressly incorporated herein by reference).

A flexible cable 48 is connected to the rear or proximal end of the female receptacle 42. In the preferred embodiment, this flexible cable 48 extends through a bore present in the female receptacle 42 and is anchored thereto by means of stainless steel pins. In the preferred embodiment, the cable 48 is formed from a braided 3/16-inch diameter cable formed from No. 316 stainless steel.

In addition to providing anchor points for the reinforcing member 34, both the nosepiece assembly 31 and the endpiece 37 provide an enlarged, annular shoulder 50 and 52 (as shown in FIGS. 2A and 2C) at the ends of the mandrel 22 that protects the relatively delicate windings of the heating coil 26 from friction and mechanical shock. These shoulders 50 and 52 also serve the important function of concentrically spacing the windings of the heating coil 26 around the longitudinal axis of the tube 10, which in turn results in a uniform heating gradient in the section of the tube adjacent to the heating coil 26.

Specific Description of the Preferred Embodiment

Turning now to FIGS. 2A, 3A, and 3B, the nosepiece assembly 31 further includes a distal spring retainer 55, in addition to the previously described forward and rear nosepieces 32 and 33. The purpose of the distal spring retainer 55 is to capture the distal-most winding 56 of the spring 24 between the annular shoulder 50 formed by outer edge of the nosepiece 33, and a pair of opposing, spring-retaining flanges 59a and 59b. These flanges 59a and 59b radially extend from the end of a mounting sleeve 57. As may be seen with respect to FIGS. 2A and 3C, the mounting sleeve 57 is insertable through a centrally disposed bore 58 in the rear nosepiece 33. In order to ensure that the spring-retaining flanges 59a and 59b will not rotate with respect to the nosepiece 33 after assembly, a short cylindrical key 60 is fixedly mounted at the base of flange 59b. This key 60 is insertable within a key slot 73 (visible in FIG. 3C) located at the proximal portion of the rear nosepiece 33. When the mounting sleeve 56 is positioned as illustrated in FIG. 2A, it extends completely through the centrally disposed bore 58, and on through another bore 64 located through the center of the front nosepiece 32. In addition to retaining the distal end of the spring 24, the spring retainer 55 further provides an anchoring point for the previously mentioned reinforcing member 34 that interconnects the nosepiece assembly 31 with the endpiece 37. In the preferred embodiment, the reinforcing member 34 is a thin, flexible rod of Inconel TM that is receivable within the bore 65 present throughout the length of the mounting sleeve 57. A slot 66 present in the side of the sleeve 57 allows the distal end of the rod forming the reinforcing member 34 to be brazed to the stainless steel forming the sleeve 57. The anchoring of the member 34 into the nosepiece assembly 31 is completed when the nosepiece assembly 31 is assembled by brazing the distal end of the sleeve 57 into the walls of the bore 64 present in the front nosepiece 32.

Turning now to FIGS. 2A, 3C and 3D, the rear nosepiece 33 of the nosepiece assembly 31 includes a pair of parallel bores 67a and 67b for housing the distal coil leads 69a and 69b of the heating coil 26. At its distal end, the nosepiece 33 includes a semicircular groove 71 for receiving the previously mentioned bridging portion 70 of the heating coil 26. This connecting or bridging portion 70 of the heating coil 26 serves to electrically connect the distal coil leads 69a and 69b. The provision of the semi-circular groove 71 in the nosepiece 33 protects the bridging portion 70 of the heating coil 26 from mechanical shock, since it allows the conical inner surface 63 of the front nosepiece 32 to lie flush against the frustro-conical exterior of the rear nosepiece 33 without any mechanical contact with the bridging portion 70 of the heating coil 26. At its proximal end the rear nosepiece 33 includes the previously mentioned key slot 73 for receiving the key 60 of the distal spring retainer 55. If desired, a sleeve of wire mesh may be mounted over the windings of the heating coil 26 by sandwiching the edge of such a sleeve in the slot 77 defined between the upper, frustro-conical surface of the rear nosepiece 33, and the conical inner surface 63 of the front nosepiece 32 before the sleeve 57 is brazed onto the bore 64 of the front nosepiece 32. The provision of such a wire mesh (which is preferably formed from a coarse screen of woven stainless steel wire) affords extra protection for the outside surfaces of the windings of the heating coil 26 against mechanical abrasion.

With reference again to FIG. 2A, it should be noted that the previously mentioned heating coil 26 is, in reality, a pair of coils having parallel windings. This may best be appreciated by examining the manner in which the coil windings commence at the proximal end of the rear nosepiece 33. Coil A commences with distal coil lead 69a, while coil B commences with distal coil lead 69b (shown in phantom). Such a coil winding configuration advantageously obviates the need for a lead-wire which would have to run the entire length of the mandrel 22. The elimination of such a leadwire is important, since such a leadwire would generate unwanted heat throughout the center of the mandrel, which is not only wasteful, but potentially damaging to the inner components of the mandrel 22.

As is best seen in FIGS. 2A and 2B, the intermeshing windings of the coils A and B which form the heating coil 26 overlie a coil spring 24 formed from Inconel TM 600. The stiffness of the spring 24 should be chosen so that the mandrel 22 is flexible enough to easily negotiate the smallest-radiused U-bends 15, yet stiff enough to provide ample support for the windings of the heating coil 26 as the mandrel 22 is pushed and pulled in and out of such U-bends. Additionally, the distance 80 between the coils 81 of the spring 24 should be small enough so that the coils of the heating coil 26 never become caught or pinched between the windings 81 of the coil spring 24, yet spaced far enough away so that adjacent windings 81 of the spring 24 never come in contact during the heat-treating process. If the windings 81 of the coilspring 24 came into mechanical contact when the heating coil 26 was actuated, there is a possibility that the resulting heat could sinter adjacent windings 81 of the spring 24 together, particularly if the spring 24 is not formed from a highly heat resistant metal, such as Inconel TM. Consequently, the coil 24 should have some distance 80 between its windings 81.

Turning now to FIGS. 2C, 4A and 4B, the rear end of the mandrel 22 includes a proximal spring retainer 86 formed from No. 304 stainless steel. This proximal spring retainer 86 is formed from a cylindrical spring guiding member 87, as well as a spring retaining flange 89 for retaining the proximal-most winding 94 of the spring 24. Near the center of the spring guiding member 87 are four bores 88a-88d. When the mandrel 22 is assembled, one of these bores 88a-88d is chosen to receive the proximal end of the reinforcing member 34, which extends completely through the guiding member 86 and is ultimately anchored in body nut 110. In the exact center of the guiding member 86 is a threaded bore 91. When the mandrel 22 is assembled, this centrally located bore 91 receives the threaded end portion 118 of the anchoring stem 116 of the body nut 110 in order to affix the proximal spring retainer 86 to the endpiece 37. Together, the distal and proximal spring retainers 55 and 86 secure the ends of the spring 24 within the mandrel 22, and help ensure that any shear forces applied to the spring by a U-bend 15 will be uniformly distributed throughout the length of the spring 24.

With reference now to FIGS. 2C, 5A, and 5B, a coil guide 95 is mounted in tandem directly behind the proximal spring retainer 86. In the preferred embodiment, coil guide 95 is formed from the same boron nitride material that the rearmost piece 33 is fabricated from. The coil guide 95 has a distal, cylindrical end 97 which is of approximately the same diameter as the outer diameter of the proximal spring retainer 86, and a cylindrical proximal end 99 of a relatively enlarged diameter. A pair of parallel bores 101a, 101b extend through the coil guide 95 along its longitudinal axis in the positions shown. These bores 101a, 101b house the leads of the heating coil 26. A pair of ramps 103a, 103b are provided in the distal end 99 of the coil guide 95 to define entryways into the lead-housing bores 101a, 101b. Additionally, the coil guide 95 includes a small, off-center bore 107 for receiving the proximal end of the reinforcing member 34, as well as a relatively larger, centrally disposed bore 105 for receiving the previously mentioned anchoring stem 116 of the body nut 110.

The body nut 110 of the endpiece 37 is best seen with reference to FIGS. 2C, 6A and 6B. In the preferred embodiment, the body nut 110 is fabricated from No. 304 stainless steel. The distal end 112 of the body nut 110 is approximately the same diameter as the proximal end 99 of the previously described coil guide 95, whereas the proximal end 114 of this component is of reduced diameter, and is threaded. As has been previously indicated, an anchoring stem 116 projects from the front face of the distal end 112 of the body nut 110 along its longitudinal axis. This anchoring stem 116 terminates in a threaded end portion 118. Parallel to the longitudinal axis of the body nut 110 are a pair of lead-housing bores 120a, 120b which are registrable with the previously described lead-housing bores 101a, 101b of the coil guide 95. In order to prevent short circuiting from occurring between the coil leads housed within these bores, ceramic sleeves 122a, 122b line each of the lead-housing bores 120a, 120b. Near the center of the body nut 110 is a bore 124 that is registrable with the bore 107 of the coil guide 95. This bore 124 communicates with a counterbore 125 of a larger diameter. Each of the co-linear bores 124 and 125 receives the proximal end of the previously described reinforcing member 34, which is anchored to the proximal end 114 of the body nut 110 by means of a loop 127 formed at the very end of the member 34, as well as by a small washer 129 that is brazed thereto (see in particular FIG. 2C).

Abutting the proximal end of the body nut 110 are a pair of semi-cylindrical insulating pieces 125a and 125b (of which only 125a is shown). These semicylindrical insulating pieces 125a, 125b form part of the previously mentioned male connector 39 of the electrical connector assembly 38. Each of these semicylindrical insulating pieces 125a, 125b includes a pair of parallel, pin-receiving bores 127a, 127b, of which only the structure of bore 127a is visible in FIG. 2C, it being understood that the structure of parallel bore 127b is identical. Each of these bores includes a central narrow section 128a, 128b flanked by a proximal enlarged section 129a, 129b and a distal enlarged section 131a, 131b. The narrow and enlarged sections of each of the pin-receiving bores 127a, 127b render each of them complementary to the shape of the connecting pins 40a, 40b, of which only the structure of pin 40a is completely visible, it being understood that pin 40b is in all respects identical to pin 40a. Each of the pins 40a, 40b includes a narrow section 133a, 133b flanked by proximal and distal flanges 135a, 135b, and 135a, 135b, respectively. Each of the narrow sections 133a, 133b is hollow, and receives the terminal ends of the braided wires 28 forming the ends of the heating coil 26. Each of these narrow sections 133a, 133b includes a crimp 139a, 139b in order to secure the braided leadwire therein.

In order to mount the semi-cylindrical insulating pieces 125a, 125b onto the body nut 110, a retaining sleeve 141 having an internally threaded skirt 143 on its distal end and a capturing flange 145 at its proximal end is provided. When the internally threaded skirt 145 is screwed over the threaded portion 114 of the body nut 90 until it abuts the end face of body nut 110, the two semi-cylindrical insulating pieces 125a, 125b are securely captured between the proximal end face of the body nut 110 and the flange 145, as shown.

In operation, the mandrel 22 of the heater assembly 20 is inserted into the open end of a heat exchange tube 10 to be heat treated, and manually slid up to the U-bend portion 15 of this tube until it assumes the position illustrated in FIG. 1B. The heating coil 26 is then actuated for a time period of approximately 5 minutes. After the U-bend 15 has been heated for approximately 5 minutes, the temperature of the U-bend is checked by manually pushing the mandrel 22 further around the U-bend until the optical window 44 is adjacent to a heated section of the U-bend 15. The heater assembly 20 is maintained in this position until a temperature reading is produced by the pyrometer (not shown) optically coupled to the optical fiber 46. After the temperature reading is taken, the mandrel 22 is manually slid back into the position shown in FIG. 1B. If the temperature is adequate, the process is continued for about 5 minutes more. If the temperature is not as desired, the power can be adjusted to compensate. The process is repeated until the U-bend section 15 is heated to a temperature which would indicate that substantially all of the residual stresses in the U-bend have been relieved.

What is claimed is:

1. A radiant heating apparatus particularly adapted for applying heat to a curved section of a metallic conduit, comprising an elongated flexible mandrel insertable within said conduit, an elongated, flexible electrical resistance heating element coiled around said mandrel for applying radiant heat to the inner walls of a portion of said conduit, and a sleeve of flexible material enveloping said electrical resistance heating element, said sleeve being electrically insulative but thermally conductive for preventing short-circuiting from occuring both between adjacent coils of said heating element, and between said coils of said heating element and said conduit, and further for maintaining substantially uniform spacing between adjacent coils of said element to avoid nonuniformities in the heat gradient generated by the heating element.

2. A radiant heating apparatus as described in claim 1, wherein said sleeve is formed from fibers of a refractory material.

3. A radiant heating apparatus as described in claim 1, wherein said sleeve is formed from alumina refractory fibers.

4. A radiant heating apparatus as described in claim 2, wherein said refractory fibers are braided together to form said sleeve.

5. A radiant heating apparatus as described in claim 1, wherein said mandrel includes a proximal and a distal end, and further including a nosepiece assembly located at the distal end having a bullet-shaped portion for facilitating the insertion of the mandrel through the curved section of the conduit.

6. A radiant heating apparatus as described in claim 1, wherein said mandrel includes a proximal and a distal end, and further including a push rod at said proximal end for positioning said heating apparatus within said curved section of said conduit.

7. A radiant heating apparatus as described in claim 1, wherein said elongated electrical resistance heating element includes wire formed from an alloy that includes platinum and rhodium.

8. A radiant heating apparatus as described in claim 7, wherein said heating element is formed from a plurality of strands of wire braided together to enhance the flexibility thereof.

9. A radiant heating apparatus as described in claim 1, wherein said flexible mandrel includes means for preventing elongation or contraction along its longitudinal axis when subjected to tensile or compressive forces along said axis, respectively.

10. A radiant heating apparatus as described in claim 1, wherein said flexible mandrel includes means for resisting shear forces applied thereto.

11. A radiant heating apparatus for heat treating curved sections of metallic tubing at temperatures in excess of 1000 degrees F., comprising an elongated flexible mandrel insertable within said tubing, a wire-like, flexible electrical resistance heating element helically wound around said mandrel for applying radiant heat to the inner walls of a portion of said tubing, and a sleeve of flexible material enveloping said wire-like electrical resistance heating element, said sleeve being electrically insulative but thermally conductive for preventing short-circuiting from occurring both between adjacent coils of said heating element, and between said coils of said heating element and said tubing, and further for maintaining substantially uniform spacing between adjacent coils of said element to avoid nonuniformities in the heat gradient generated by the heating element.

12. A radiant heating apparatus as described in claim 11, wherein said sleeve is formed from fibers of a refractory material.

13. A radiant heating apparatus as described in claim 11, wherein said sleeve is formed from alumina refractory fibers.

14. A radiant heating apparatus as described in claim 11, wherein said flexible mandrel includes means for preventing elongation or contraction along its longitudinal axis when subjected to tensile or compressive forces along said axis, respectively.

15. A radiant heating apparatus as described in claim 11, wherein said flexible mandrel includes means for resisting shear forces applied thereto in the form of a plurality of interfitting ceramic bead means.

16. A radiant heating apparatus for heat treating a U-bend in a nickel alloy heat exchanger tube at temperatures of over 1000 degrees F., comprising an elongated flexible mandrel insertable within said tube, said mandrel including means for preventing elongation or contraction along its longitudinal axis when subjected to tensile or compression forces along said axis, a wire-like, flexible electrical resistance heating element helically wound around said mandrel in a single layer of adjacent coils for applying radiant heat to the inner walls of a portion of said tube, and a sleeve of flexible material formed from braided fibers of a refractory material for preventing short-circuiting from occurring both between adjacent coils of said heating element, and between said coils and said tube.

17. A radiant heating apparatus as described in claim 16, wherein said flexible mandrel includes means for resisting shear forces applied thereto in the form of a plurality of interfitting ceramic bead means.

18. A radiant heating apparatus as described in claim 16, wherein said refractory fibers are braided together to form said sleeve.

19. A radiant heating apparatus as described in claim 16, wherein said mandrel includes a proximal and a distal end, and further including a push rod at said proximal end for positioning said heating apparatus within said U-bend of said tube.

20. A radiant heating apparatus as described in claim 16, wherein said heating element is formed from a plurality of strands of platinum-rhodium wire.

21. A radiant heating apparatus as described in claim 20, wherein said strands of wire are braided.

* * * * *